US010098209B2

(12) United States Patent
Cavalcanti et al.

(10) Patent No.: US 10,098,209 B2
(45) Date of Patent: Oct. 9, 2018

(54) SYSTEM AND METHOD FOR OUTDOOR LIGHTING OPERATION AND MANAGEMENT USING ITS PROTOCOLS AND CONNECTIVITY INFRASTRUCTURE

(71) Applicant: PHILIPS LIGHTING HOLDING B.V., Eindhoven (NL)

(72) Inventors: Dave Alberto Tavares Cavalcanti, Eindhoven (NL); Dong Han, Newton, MA (US); Dan Jiang, Westford, MA (US); Talmai Brandão De Oliveira, North Andover, MA (US); Yong Yang, Ossining, NY (US); Amjad Soomro, Hopewell Junction, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/518,708

(22) PCT Filed: Sep. 30, 2015

(86) PCT No.: PCT/IB2015/057471
§ 371 (c)(1),
(2) Date: Apr. 12, 2017

(87) PCT Pub. No.: WO2016/059499
PCT Pub. Date: Apr. 21, 2016

(65) Prior Publication Data
US 2017/0251541 A1  Aug. 31, 2017

Related U.S. Application Data

(60) Provisional application No. 62/153,578, filed on Apr. 28, 2015, provisional application No. 62/065,055, filed on Oct. 17, 2014.

(51) Int. Cl.
*H05B 37/02* (2006.01)
*H04L 29/08* (2006.01)
*G06Q 30/04* (2012.01)

(52) U.S. Cl.
CPC ......... *H05B 37/0272* (2013.01); *G06Q 30/04* (2013.01); *H04L 67/12* (2013.01)

(58) Field of Classification Search
CPC combination set(s) only.
See application file for complete search history.

(56) References Cited

U.S. PATENT DOCUMENTS

| 2010/0194595 | A1 | 8/2010 | Mimeault et al. |
| 2011/0288658 | A1 | 11/2011 | Walters et al. |
| 2012/0038490 | A1 | 2/2012 | Verfuerth |
| 2012/0068656 | A1 | 3/2012 | Fulton |
| 2012/0086561 | A1 | 4/2012 | Ilyes et al. |

FOREIGN PATENT DOCUMENTS

| CN | 201689552 U | 12/2010 |
| CN | 103794052 A | 5/2014 |
| WO | 2012170953 A2 | 12/2012 |
| WO | 2013108162 A1 | 7/2013 |
| WO | 2013144846 A1 | 10/2013 |
| WO | 2013164726 A2 | 11/2013 |

*Primary Examiner* — Jianzi Chen (57) ABSTRACT

Inventive methods and apparatus for management of outdoor lighting networks. In particular, methods and apparatus are provided that enable the operation and management of outdoor lighting infrastructure leveraging an ITS infrastructure and connected devices, as well provided parking and payment services to users.

18 Claims, 6 Drawing Sheets

SYSTEM AND METHOD FOR OUTDOOR LIGHTING OPERATION AND MANAGEMENT USING ITS PROTOCOLS AND CONNECTIVITY INFRASTRUCTURE

CROSS-REFERENCE TO PRIOR APPLICATIONS

This application is the U.S. National Phase application under 35 U.S.C. § 371 of International Application No. PCT/IB2015/057471, filed on Sep. 30, 2015 which claims the benefit of U.S. Provisional Patent Application No. 62/153,578, filed on Apr. 28, 2015 and U.S. Provisional Patent Application No. 62/065,055, filed on Oct. 17, 2014. These applications are hereby incorporated by reference herein.

The present invention is directed generally to management of outdoor lighting networks. More particularly, various inventive methods and apparatus disclosed herein relate to operation and management of outdoor lighting infrastructure leveraging an Intelligent Transportation Systems (ITS) infrastructure and connected devices.

Systems have been introduced for the remote management of an outdoor lighting network (OLN). For example, lighting units of an OLN may be remotely managed to provide control over lighting behavior (e.g., scheduling of the on/off times of the lighting units and/or setting dimming levels of the lighting units) and/or to monitor lighting unit characteristics (e.g., light source status, energy consumption, lighting unit specifications). Management of outdoor lighting networks may provide one or more benefits to customers (e.g., municipalities) such as energy savings, reduced maintenance costs, and/or reduced lighting pollution.

Outdoor Lighting Networks are the communication networks deployed in the outdoor space enable remote lighting control and monitoring. Vendors provide different solutions using different connectivity technologies, such as IEEE 802.15.4, IEEE 802.11, cellular, power line, etc. An OLN can be used to save energy and enhance safety by adapting lighting to better address the requirements of the specific road conditions (e.g. traffic, weather, events, and visibility).

In general, the lighting system provider either builds, operates and maintains its own outdoor lighting network infrastructure (e.g. mainly using either power line or wireless mesh networks) or install a long-range connectivity (ultra-narrow band, 2G, 3G, 4G, . . . ) or contracts the M2M connectivity services from a third party (e.g. telecom or M2M platform provider). In the former case, operating and maintaining its own infrastructure for many years involves high material, labor and liability costs. Although relying on third party connectivity relieves the lighting provider of the burden to maintain its own infrastructure, the cost of third party connectivity reduces the lighting provider's profit margins and also impacts limit functionality as system designers try to minimize the communication as much as possible to reduce data costs. Furthermore, the cost for lighting companies can be especially high in remote areas or extended highways in both own-infrastructure and third party models.

In technical aspects, power line-based solutions have very limited applicability due to interference issues with the power grid, and both RF mesh networks and cellular based connectivity face typical challenges of any large scale wireless system, namely: Scalability (potentially thousands of nodes): efficient and scalable end to end communication and cost-effective in bandwidth usage; Interference and reliability: robustness to harsh and changing environment conditions, especially in the ISM bands, and issues with bandwidth utilization and coverage in cellular systems; Security: risk of access control of key city/government assets/infrastructure by unauthorized users.

Additionally other services, such as parking services, can be a significant challenge for service providers and municipalities. From the customer's point of view, finding a parking spot in the cities becomes more and more hard nowadays, especially in areas without parking garage available. The time for a driver to find an available street parking spot keeps increasing during the last few years. From the city manager's point of view, efficiently guiding drivers to find the closest parking spots could help reduce traffic, reduce the energy waste and $CO_2$ emissions for driving around to locate a parking spot. Tracking parking availability and reducing time to find parking is costly and inaccurate, as well as requiring specific infrastructure. For example, with current technology, the available parking space information can be provided to driver through mobile applications or from a signage information board in a parking garage. There are some apps already on the market which can provide available parking space to the driver; however, accurate information about the available parking space on the street is very difficult and costly to obtain in real-time. Moreover, in order for a mobile application to provide street parking space availability information, it requires sensors installed under the ground along the road or near the spot to detect whether the parking spot is occupied or not. This solution (e.g. as provided by streetline.com) is very costly.

The drivers also have to pay the parking fee at pay station besides the road by cash or card, or even have to use quarters to buy certain amount of time on traditional meters. How to collect the cash in these pay station and meter is another disadvantage. Officers have to visit every pay station and meter in the city to collect the money there. Besides the long distance they have to drive in order to cover all meters in the city, they must visit each meter in time, since the money box in the meter is limited. Furthermore, since it is hard to track how much money has been collected on each meter, so auditing the parking income is difficult. In addition, dynamically adjusting the parking fee is almost impossible to implement on regular meters, for example the parking fee gets higher during the business hour, lower during the night and free for the weekend.

Further, the payment system of street parking is not user friendly; especially under current advanced technology conditions. Either pay using a meter or payment station, the driver has to guess how much time he is going to need for this parking, then pay the parking fee before he actually completes his business. It is very likely for the user to have a wrong estimation of the actual parking time. If the purchased time is too short, then the driver may receive a ticket or he has to go back and purchase more time. If the purchased time is too long, it means the driver wastes money on purchasing unnecessary parking time.

Another drawback of current manual parking payment system relates to parking service provider. The cost to maintain those meters and devices is high. Another high cost for the parking service provider is on the cash collection, the only method to collect money from those meters is to physically stop by every meter by an officer, who has to collect the cash on each of them and bring them back to the office, the labor and transportation cost to visit every meter in a city is significant.

The current method to track and inspect whether or not the driver has paid the street parking fee appropriately is also very low efficient and labor cost-intensive. A city enforcement officer has to physically stop by each car on the street, to examine the parking ticket on the dash board of car or check the meter besides the car, in order to inspect whether the parking fee has been paid and the allowed parking length is not exceeded, and to issue fine to the violators who don't pay the parking fee accordingly. It is very inefficient to make sure every car has made the payment. If the driver did not make any payment, and no officer has stopped by during the parking period, it means the driver avoids the parking fee or even ticket.

Governments and industry have been investing on Intelligent Transportation Systems (ITS) for many years and with the increasing availability and relative low cost of sensing and connectivity technologies ITS-based applications are being introduced in the commercial market. Connected vehicles are already a reality in the high-end market segment and they are expected to reach mainstream in the future given the safety, economic and environmental benefits which are resulting in aggressive policies, such as the recently announced plan by the US Department of Transportation (DoT) to mandate Dedicated Short Range Radio (DSRC) radios in every new car to increase safety, similar to the mandated seat belts and air bags today. In addition to policy, governments and industry have been partnering to define interoperability standards to ensure wide market adoption of the underlying technology necessary for realizing the ITS vision, illustrated in FIG. 1. The figure also shows the standards and protocols developed for ITS, and as can be seen, the infrastructure is not only used for critical safety related applications, but also for non-safety applications, such as providing information to drivers.

The ITS infrastructure emerges as a new pervasive communication fabric across cities that will enable various applications in traffic safety, management and others to be invented. Thus, there is a need to leverage the ITS infrastructure to operate and manage lighting in a cost-effective, reliable and secure fashion without relying directly on network providers or operating a large scale wireless network, while optionally overcoming one or more disadvantages of other proposals.

Figure 1:
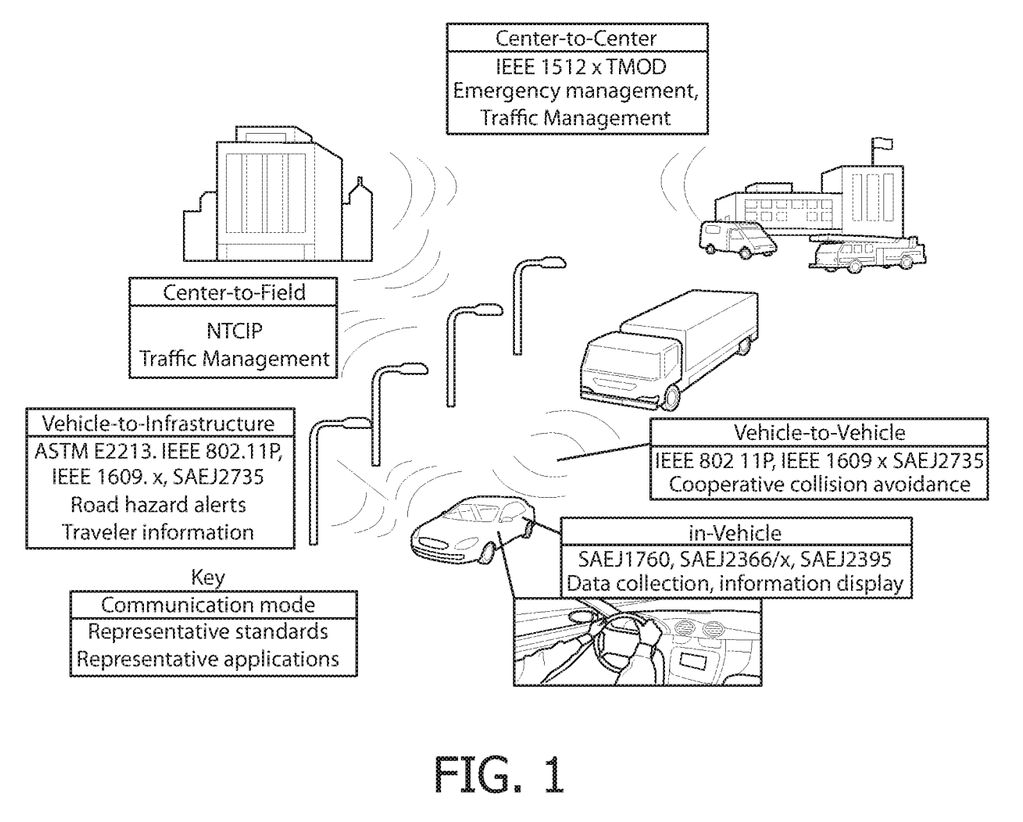
FIG. 1 illustrates an ITS infrastructure.

The present invention is directed to inventive methods and apparatus for the management and operation of outdoor lighting networks. For example, in some embodiments methods and apparatus are provided that enable a Lighting Central Management System (CMS) to use standard lighting protocols (such as TALQ) to connected to a Traffic Management Server (TMS) and delegate the lighting operation and management. The CMS can also include an integrated Parking Space Dissemination System (PSDS) 211 or the PSDS 211 can be a stand-alone unit connected to the CMS as shown in FIG. 1. The PSDS provides integrated parking information, remote parking fee collection service, and outdoor display/signage control. The system also provides integrated parking rate information, remote parking fee payment service, and issue payment charge confirmation, while protecting the privacy of connected vehicle and its drivers. An ITS-LM (Lighting Manager) maps messages from the lighting protocol (e.g. TALQ) to the ITS protocols (e.g. NTCIP, SAE J2735) and delivers the messages to/from target lighting units.

Generally, in one aspect, an outdoor lighting network management system using an ITS infrastructure including ITS connected vehicles (270) having wireless communication units (225) and ITS connected devices (270), and a traffic management server (230) in communication with the ITS connected vehicles (270) and connected devices (270, the system comprising an outdoor lighting network (215) each including a plurality of light units (280), wherein each light unit (280) includes a light control unit (290) to communicate with other light units or the ITS connected vehicles (270) and/or other connected devices (270); a lighting central management system (210) in communication with said outdoor traffic management server (230), said lighting central management system (210), using the traffic management server (230), to send a lighting configuration/operation command to the outdoor lighting network (215) or light unit (280) and receives light unit (280) information from the outdoor lighting network (215) or light unit (280), and wherein the traffic management server (230) includes an ITS-light manager (295) to translate the lighting configuration/operation commands from a lighting protocol to an ITS protocol and map the light control units (290) to a nearby ITS connected vehicles (270) and/or connected devices (270).

Generally, in another aspect, an ITS-light manager, for use in an ITS traffic management server (230), the ITS-light manager comprising: a processor to receive a lighting asset information, wherein the lighting asset model describes an outdoor lighting network (215) having a plurality of light units (280), and receive lighting configuration/operation command from a lighting central management system of the outdoor lighting network, and translate the lighting configuration/operation command from a lighting protocol command to an ITS protocol command and map the light units (280), using the lighting asset information, to a nearby ITS connected vehicles (270) and/or connected devices (270) in communication with the ITS traffic management server (230).

Generally, in another aspect, a method of managing an outdoor lighting network management system, using an ITS infrastructure including ITS connected vehicles (270) having wireless communication units (225) and ITS connected devices (270), and a traffic management server (230) in communication with the ITS connected vehicles (270) and connected devices (270), the outdoor lighting network (215) including a plurality of light units (280), wherein each light unit (280) communicates with other light units (280) or the ITS connected vehicles (270) and/or other connected devices (270); the method comprising the steps of: in the traffic management server (230), receiving a lighting asset information, wherein the lighting asset information describes the outdoor lighting network (215), receiving a lighting configuration/operation command; translating the lighting configuration/operation commands from a lighting protocol to an ITS protocol; and mapping the light units (280), using the lighting asset information, to a nearby ITS connected vehicles (270) and/or connected devices (270).

The term "light source" should be understood to refer to any one or more of a variety of radiation sources, including, but not limited to, LED-based sources (e.g., various semiconductor-based structures that emit light in response to current, light emitting polymers, organic light emitting diodes (OLEDs), electroluminescent strips, and the like), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communication medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communication medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

Existing connected lighting systems enable remote control and monitoring of outdoor lighting across large areas including, streets, roadways, urban spaces, parking lots etc. Such systems rely on a number of communication technologies such as power line, IEEE 802.15.4, 802.11, proprietary radios in ISM bands, and cellular networks (2G/3G/4G). In general, the lighting system provider either builds, operates and maintain its own Outdoor Lighting Network (OLN) (e.g., mainly in the case of power line and wireless mesh networks) or contract connectivity services from a third party (e.g., telecom/Machine-to-Machine—M2M platform provider). However, in either case, the cost of connectivity can be significant, which reduces business operating margins. This invention describes system and methods to implement, operate and managing lighting infrastructure without maintaining a lighting network nor relying on third party connectivity such as cellular or ultra-narrow band etc. for every light point.

The ITS infrastructure emerges as a new pervasive communication fabric across cities that will enable various applications in traffic safety, management and others to be invented. Thus, there is a need to leverage the ITS infrastructure to operate and manage lighting in a cost-effective, reliable and secure fashion without relying directly on other network providers or operating a large scale wireless network, while optionally overcoming one or more disadvantages of other proposals.

The ITS infrastructure is designed to achieve a vision of a national, multi-modal surface transportation system that features a connected transportation environment among vehicles, the infrastructure and passengers' portable devices. This connected environment will leverage technology to maximize safety, mobility and environmental performance.

One aspect of the ITS infrastructure relates to connected vehicles that encompasses a suite of technologies and applications that uses wireless communications to provide connectivity between vehicles; between vehicles and roadway infrastructure; and among vehicles, infrastructure and wireless consumer devices.

The ITS infrastructure further relates to the following: Vehicle to Vehicle (V2V) Communications for Safety: vehicle based safety applications; Vehicle to Infrastructure (V2I) Communications for Safety; Real-Time Data Capture and Management: assess what traffic, transit and freight data are available today from various sources; Dynamic Mobility Applications: examine what technologies can help people and goods effortlessly transfer from one mode of travel (car, bus, truck, train, etc.) or route to another for the fastest and most environment-friendly trip; Road Weather Management: consider how vehicle-based data on current weather conditions can be used by travelers and transportation agencies to enable decision-making that takes current weather conditions and future weather forecasts into account; Applications for the Environment: Real-Time Information Synthesis (AERIS): explore how anonymous data from tailpipe emissions can be combined with other environmental data; Human Factors: examine the extra burden that in-vehicle devices may put on drivers, with the goal of minimizing or eliminating distraction risks; Mode-Specific Research: active traffic management, international border crossing, roadside infrastructure, commercial vehicles, electronic payment and maritime applications. Exploratory Research: safety research for rail, technology scanning, and a solicitation for new research ideas; Cross-Cutting Activities: architecture, standards, professional capacity building, technology transfer, and evaluation.

More generally, Applicants have recognized and appreciated that it would be beneficial to provide inventive methods and apparatus related to the operation and management of outdoor lighting infrastructure leveraging the ITS infrastructure and connected devices.

In view of the foregoing, various embodiments and implementations of the present invention are directed to the management and operation of outdoor lighting networks.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described particularly in conjunction with control of light sources and other lighting related aspects of OLNs. However, one or more aspects of the methods and apparatus described herein may be implemented to additionally control one or more aspects of other applications supported by OLN infrastructure such as, for example, surveillance, traffic monitoring, emergency response, and/or public safety. Implementation of the one or more aspects of an OLN management system described herein to control one or more aspects of other applications supported by OLN infrastructures is contemplated without deviating from the scope or spirit of the claimed invention.

ITS infrastructure includes several devices along roadways, such as roadside units, field devices (road sensors, traffic signals, cameras and etc.), DSRC radios or other forms of wireless communication in cars. The present invention discloses an approach to exchange information between the lighting system and the ITS devices to enable lighting operation and management. In one embodiment of this invention, the lighting infrastructure will firstly be installed and commissioned so that the lighting CMS 210 has all the lighting asset information necessary to the operation and management of the lighting features (asset data, location, capabilities, etc.), even though it may not directly communicate with the Light Control Units (LCUs). This lighting asset information is used to form an OLN model of the lighting infrastructure.

Figure 2:
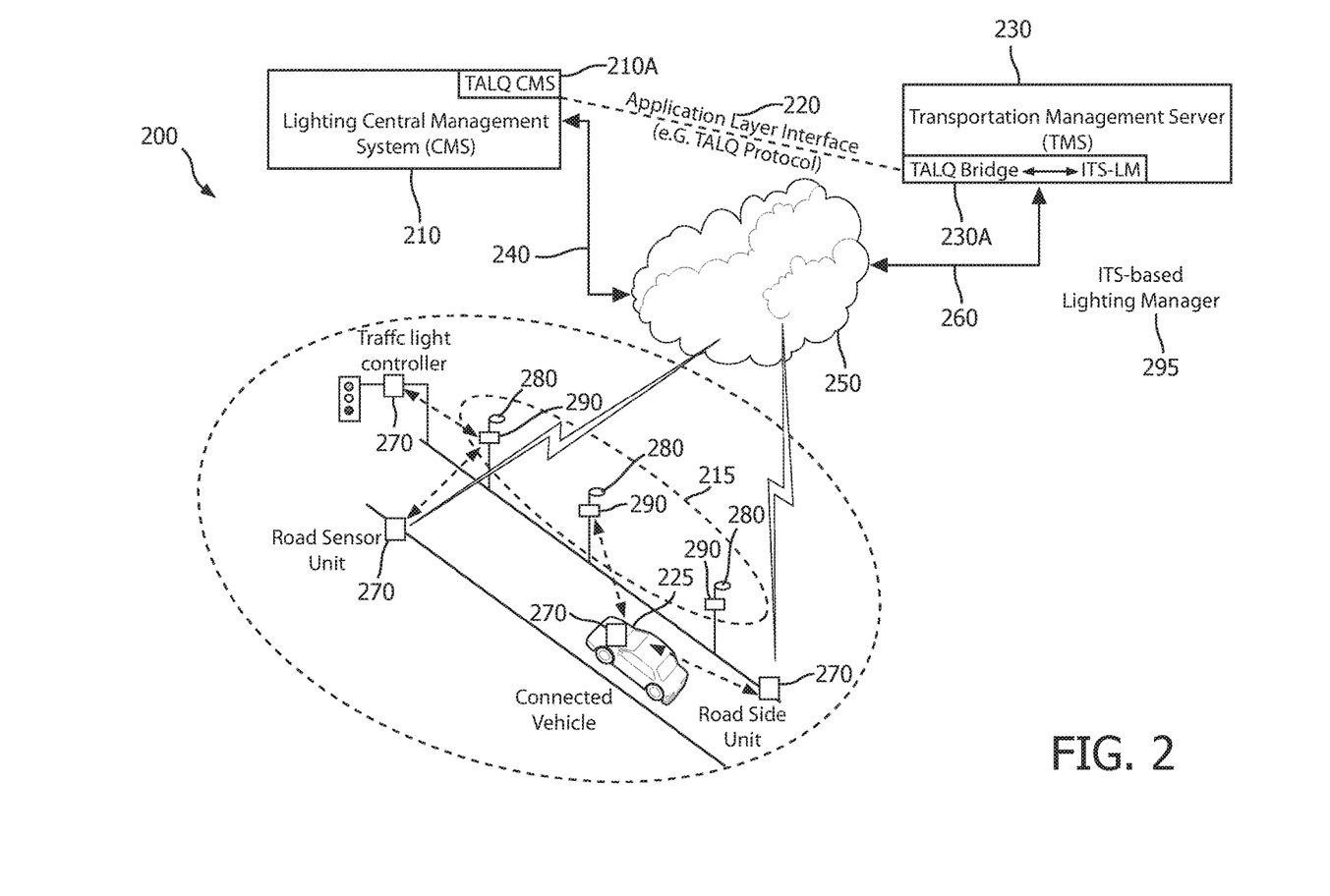
FIG. 2 illustrates an embodiment of an OLN management system using an ITS infrastructure.

In one embodiment, the lighting central management system (lighting CMS) and the transportation management server of the ITS infrastructure implements a lighting application protocol (e.g. TALQ protocol), where the TMS implements the TALQ Bridge 230A and a ITS-light manager 295 of the interface as illustrated in FIG. 2. Referring to FIG. 2, an embodiment of an OLN management system 200 is illustrated. The OLN management system 200 includes a lighting CMS 210 in communication with a TMS 230 via communication link 220. The lighting CMS 210 and TMS 230 also include a protocol bridge, such as the TALQ protocol, 210A and 230A, respectively, as further described below. The ITS infrastructure also includes a plurality of ITS enabled devices 270, such as roadside units, field devices (road sensors, traffic signals, cameras and etc.), DSRC radios or other forms of wireless communication units in cars. For example, Connected Vehicle 270 includes a wireless communication units (225) such as a DSRC radio. OLN management system 200 has Light Units 280 that include light control units (LCUs) 290 to enable communication with the ITS connected devices 270 and other Light control units 290. The Light Units 280 can be grouped to form outdoor lighting network(s) 215. The CMS 210 has a Communication link 240 to a network 250, such as a cloud network (OLNs). Communication link 240 is used for sending data back to TMS 230 from RSU/OBU/Light Unit as well as sending configuration/control commands from TMS 230 to RSU/OBU/Light Unit. Communication link 240 can be cellular, fiber, Ethernet and the like. TMS 230 also has a Communication link 260 to network 250 to communicate with the ITS connected devices 270. Communication links 220, 240, 260 and communications between network 250, ITS connected devices 270 and light control units 290 may include, for example, one or more wireless, wire/cable, and/or fiber optic links.

TALQ relates to an application protocol at the interface between the lighting central management system (CMS) and outdoor lighting networks (OLNs). TALQ will deliver a software protocol specification for this interface that covers parameters and behavior of end-points at the OLN and CMS side, needed for interoperability at application level.

In one embodiment of this invention, the lighting infrastructure will be installed and commissioned so that the Lighting CMS 210 has all the information necessary to the operation and management of the lighting features (asset data, location, capabilities, etc.), even though it may not directly communicate with the light control units (LCUs) 290.

In some embodiments the CMS 210 may include a computer such as a desktop computer, a handheld computer device, a server, and/or a bank of servers. The computer may execute computer program instructions that implement one or more of the functions specified in this application that are associated with such device. The lighting CMS 210 may include at least one user interface allowing the customer to perform functions related to the lighting CMS 210. In some embodiments the lighting CMS 210 may provide different control and/or information capabilities to certain users. For example, in some embodiments a hierarchical control model may be utilized where authorities at different levels access the lighting CMS 210 with different priorities. As an example, different management levels (e.g., local, city, state, national) could have control and/or information capabilities that are tailored for the particular management level.

The OLN 215 may include one or more segment/local controllers, for example to form a mesh network of light units, and/or other associated assets, (e.g., lighting fixtures, sensors, light sources, cameras, storage devices, power sources). Generally, the lighting CMS 210 communicates indirectly with each of the LCUs 290 via the ITS infrastructure to remotely control and manage certain aspects of the devices of the Light Units 280.

For example, the lighting CMS 210 indirectly communicates with the light units 280 or OLN 215 to control and manage the lighting behavior (e.g., switch on/off, set dimming level, set color level, and/or set lighting schedule) of one or more of the light units 280 of OLN 215. Moreover, each light unit's 280 and light control unit 290 communicate with other light units 280 or the connected vehicles 270 (via the DSRC radio or other wireless communication device, for example) and/or other connected devices 270. The lighting CMS 210 sends lighting configuration/operation commands to the TMS 230. As further described below, the TMS 230 uses the TALQ Bridge 230A to receive the TALQ (or other lighting protocol) commands and messages and a ITS-lighting manager 295 to translate the lighting configuration/operation commands from a lighting protocol to an ITS protocol and map the light control units 290 to a nearby or the nearest ITS connected vehicles 270 and/or connected devices 270. In this manner the lighting CMS 210 sends the lighting configuration/operation commands to the outdoor lighting network (215) and receives light unit (280) information from the outdoor lighting network (215). The light unit (280) information includes details of the light units 280, and the configuration commands set a configuration of at least one of the light units 280.

Also, for example, the CMS 210 may indirectly communicate, as noted above, with the Light Units 280 to control and manage measurements and feedback configuration of one or more Light Units 280 (e.g., receive and manage measurements and/or feedback from one or more Light Units 280, alter measurement and feedback status of one or more Light Units 280, and/or alter measurement and feedback reporting frequency of one or more Light Units 280). Also, for example, the CMS 210 may also indirectly communicate with the Light Units 280 to control and manage one or more Light Units 280 (e.g., manage information of Light Units 280 controllers, lighting fixture, sensors, cameras, and/or power sources; switch on/off OLN).

The lighting CMS 210 may also indirectly manage other aspects of the Light Units 280. For example, the lighting CMS 210 may communicate with respective of the Light Units 280 to perform commissioning of one or more Light Units 280 (e.g., assigning geographical information to the device, assigning initial installation location information to the device, assigning initial configuration information to the device, and/or assigning relationships between multiple devices). Also, for example, lighting CMS 210 may be used to manage the Light Units 280 (e.g., optimize communication between OLN devices, identify and troubleshoot connectivity issues, and/or install software updates). Also, for example, the lighting CMS 210 may also be used to provide security management (e.g., verify newly connected Light Units 280, detect security breaches, and/or correct security issues).

Figure 3:
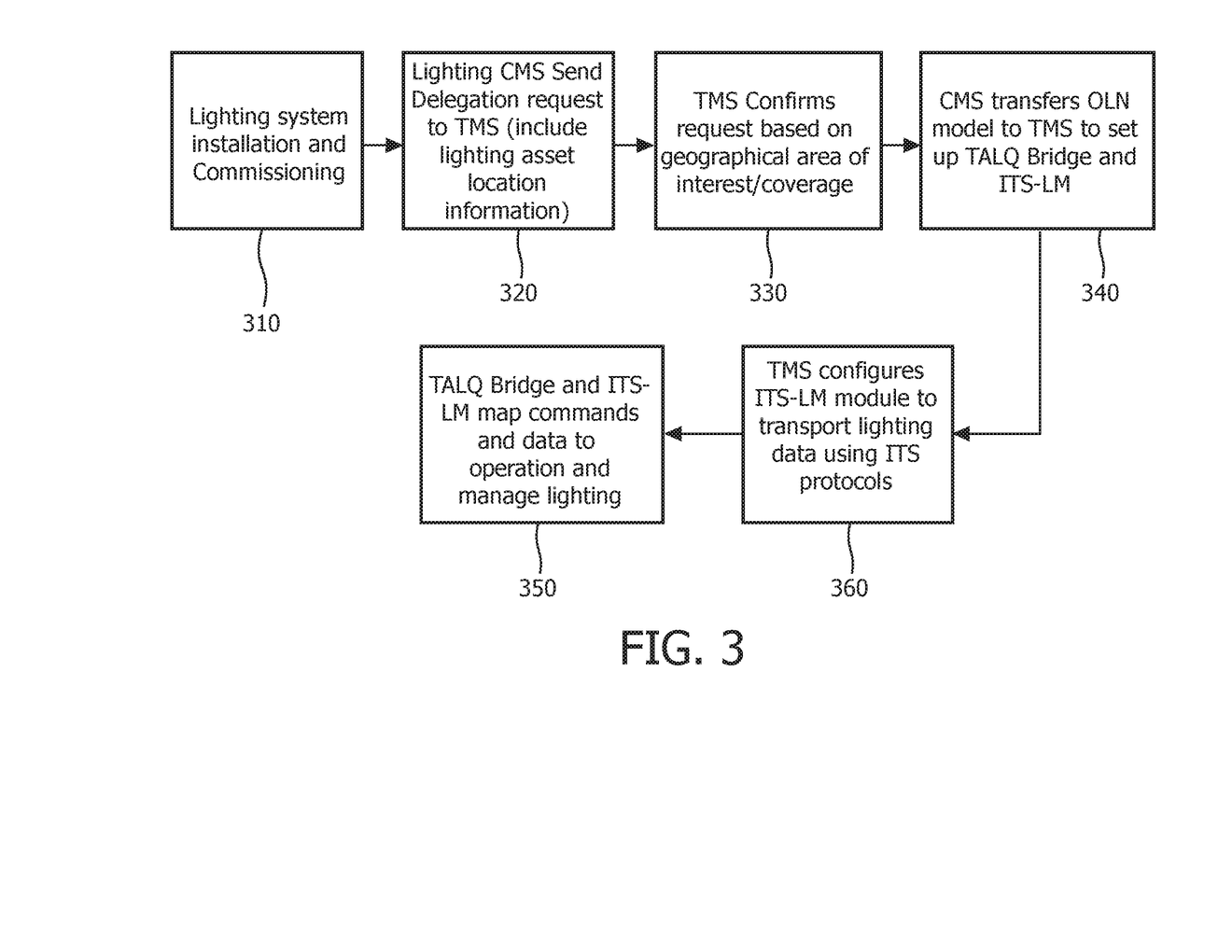
FIG. 3 illustrates an embodiment of a method to establish the connection between a Lighting Central Management System and an ITS Traffic Management System and enable its configuration.

FIG. 3 describes process to establish the connection with TMS 230 and enable the configuration of the TALQ Bridge and the ITS-Lighting Manager (LM) 295 at the TMS 230 side. Although the TALQ Bridge 230A and ITS-lighting manager 295 are shown at two separate units, they can be combined into one unit with one processor. The TALQ Bridge models the underlying lighting infrastructure using lighting asset information (including light unit 280 specifications, location, installation and commissioning details, etc.) from the lighting central management system 210. The TALQ Bridge 230A thus enables the lighting CMS 210 to have control over it transparently. The ITS-LM 295 implements the procedures to convert/map the TALQ commands received from the TALQ Bridge 230A to the application messages that can be delivered to one or more destinations in the ITS infrastructure.

In reference to FIG. 3, in step 310, the lighting system installation and commissioning is completed. In step 320, the lighting CMS 210 sends a delegation request to TMS 230 (and includes lighting asset location information). In step 330, the TMS 230 confirms the request based on geographical area of interest/coverage information. In step 340, the lighting CMS 210 transfers an outdoor lighting network (OLN) model to the TMS 230 to set up the TALQ Bridge 230A and the ITS-LM 295. In step 350, the TALQ Bridge 230A and ITS-LM 295 map commands and data to operate and manage light units 280. In step 360, the TMS 230 configures the ITS-LM 295 to transport lighting data using the ITS protocols.

In another embodiment, the lighting CMS 210 may send a lighting control message to the TMS 230 using the TALQ protocol together with the geo-location of the target LCU(s) 290. The TMS's 230 ITS-LM 295 will use standard ITS protocols to forward the message to the target LCU(s) 295 outfitted with DSRC module. The process to deliver the message from the lighting CMS 210 to the target LCUs 290 through the TMS is illustrated in FIG. 5.

Figure 4:
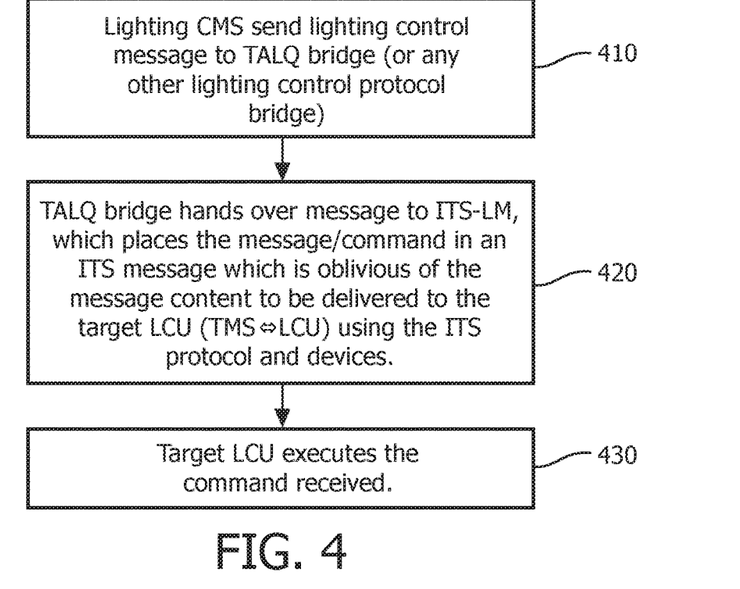
FIG. 4 illustrates an embodiment of a method to deliver a command/message from a Lighting Central Management System to a target Light Unit through the ITS Traffic Management System.

In reference to FIG. 4, in step 410, the lighting CMS 210 sends a lighting control message to the TALQ Bridge 230A (however, the TALQ Bridge 230A can also be any other type of lighting control protocol bridge). In step 420, the TALQ Bridge 230A hands over the message to the ITS-LM 295, which converts or places the message/command to/in an ITS message, irrespective of the message content to be delivered to the target LCU 290, using the ITS protocol and ITS devices 270. In step 430, the target LCU 290 executes the command received.

Figure 5:
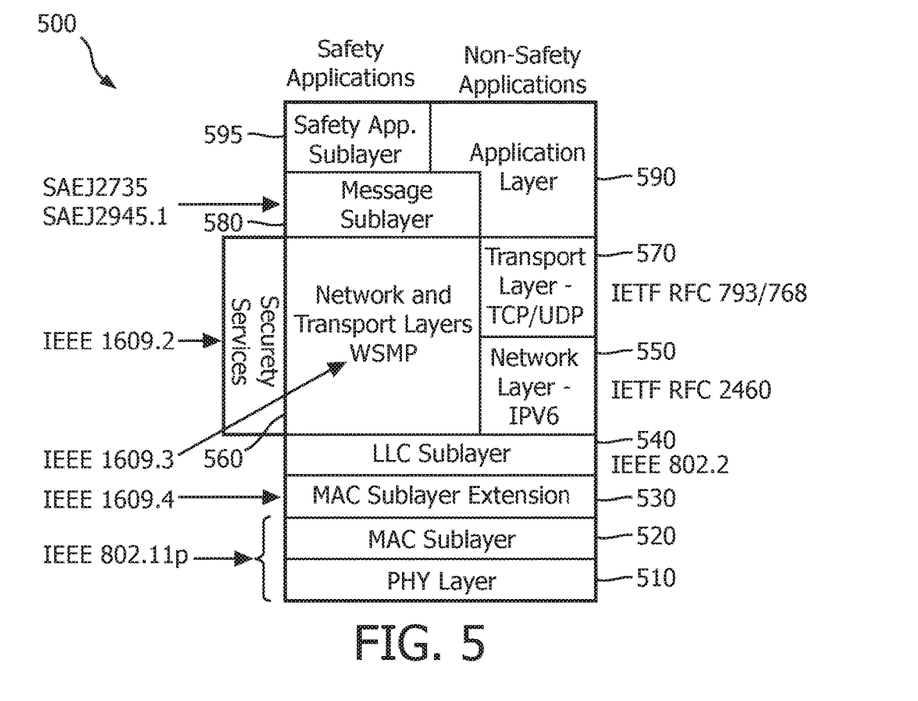
FIG. 5 illustrates an embodiment of a protocol stack implementation that may be implemented in the embodiment of FIG. 2 of the OLN management system.

Referring to FIG. 5, an embodiment of an ITS and DSRC protocol stack 500 implementation that may be implemented in the Lighting management system 200, is illustrated. The TMS 230 is in communication with ITS devices 270. The TMS 230 includes a protocol stack having physical layer 510, a MAC sublayer 520, a MAC Sublayer Extension 530, a LLC Sublayer 540, a Network Layer 550, a Network and Transport Layers WSMP 560, a Transport Layer TCP/UDP 570, a Message Sublayer 580, an application layer 590 and a Safety Application Sublayer 595. The protocol stack 500 is adapted to enable application layer messages for Non-safety applications to include lighting application commands to operate and request data from the lighting devices as defined in lighting standards (e.g., TALQ). The new lighting specific information element is added to ITS specific application layer messages. For instance, the ITS NTCIP protocol may be used for traffic management, which includes application messages for operation of traffic signals (as shown in FIG. 2), which is also equipped with a DRSC radio and can communicate with the nearby LCUs 290. In this case, the ITS-LM 295 may embed a lighting specific command within a NTCIP message and deliver the message to the traffic signal closest to the target LCU(s) 290. If the message is a group command/request, the LCU 290 may also broadcast it using its DSRC interface so that other nearby LCUs 290 could also receive it. In this way, a remote command could be delivered to one or more LCUs 290 in a nearby group and even propagate through the roadway from an entry point in the ITS network (e.g. from a RSU). Other ITS devices 270 could also be used as relaying stations, such as vehicles, roadside units, sensors, etc.

Once the LCU 290 has operational data ready to send to lighting CMS 210, it will use its outfitted DSRC radio to rely the message to the nearest road side unit (RSU) using the standard ITS protocols, complete the mutual authentication, send message to RSU in the format of non-safety application. The RSU will relay the messages back to the TMS 230, which will be forwarded to the lighting CMS 210, e.g. using the TALQ protocol.

In another aspect of this invention, lighting control messages or lighting operational messages can be forwarded by the moving vehicles or other devices between the LCUs 290 and ITS devices (RSU) 270.

Additionally, safety-application messages could be used to deliver lighting commands with higher priority. For instance, a lighting command could be included in an Emergency Vehicle Alert (EVA) message defined in SAE J2735 to increase lighting level for an emergency vehicle.

In another aspect of the invention, a National Transportation Communications for ITS Protocol (NTCIP) message can also be used. The NTCIP message consists of and carries a lighting CMS 210 message and it has origination and destination address of the lighting control unit 290. The NTCIP message includes: a command sequence number, authentication credentials, time stamp, priority, Lighting message body; consists of valid lighting message formats defined in a lighting application protocol, such as TALQ or other application protocols.

In yet another aspect of the invention, information collected at the roadside from cars (e.g. ITS devices 270 such as cars with DSRC radios) ("heart-beat" signals or beacons such as "here I am"), can be used to provide traffic flow information (for individual vehicle and collectively) or other types of information to either the city or other end users that can be used to implement intelligent traffic management systems.

Figure 6:
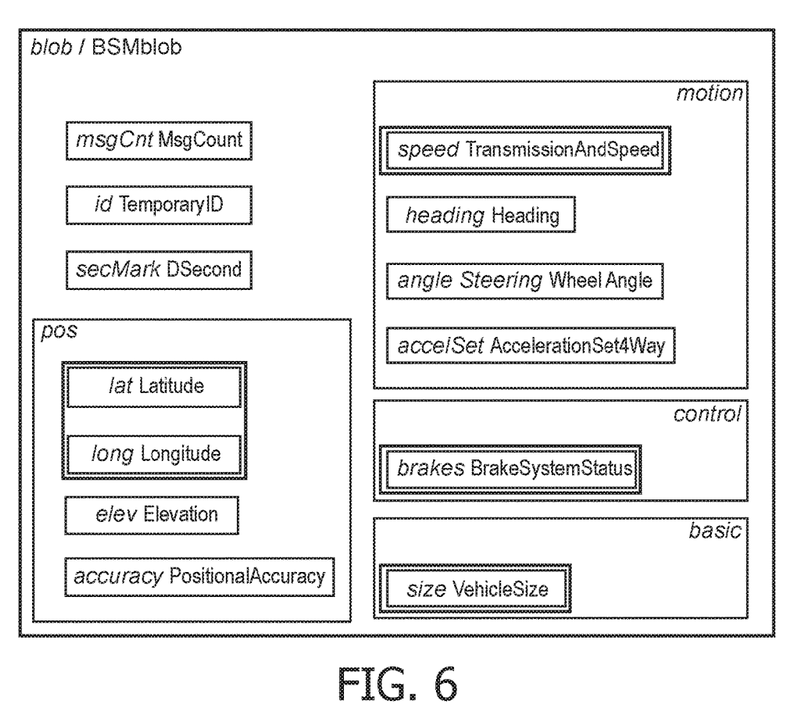
FIG. 6 illustrates element of a Basic Safety Message of an Intelligent Transportation Systems (ITS).

In another embodiment, the LCU 290 communicates with nearby connected vehicles 270 through the wireless communication units (225), for example, a DSRC radio. The Basic Safety Message (BSM) transmitted from connected vehicles 270 to LCU 290 contains the vehicle temporary ID, running speed, current location obtained from GPS, etc. FIG. 6 shows the mandatory elements of BSM as set by the standard given in SAE J2735. The BSM packet is broadcasted 10 times every second. In one aspect of the system 200, it uses existing content in the BSM to calculate the occupancy state of a parking space, without need of modifying existing standard. The following are the elements of BSM that can be used by a LCU 290:

Latitude and Longitude:

These two values report the current location of the connected vehicles 270. If the vehicle reports its precise GPS location to LCU, then the LCU 290 can mark the occupancy state of a specific parking spot, since the GPS location of each parking spot can be already measured and saved in the system ahead of time. If the connected vehicles 270 cannot provide precise GPS location, or the provided location has some bias, the LCU 290 may only be able to update the total number of parking spots occupied in a nearby area, but that should be enough for CMS 210 to calculate the available parking spaces around that location. For example, assume there are 10 parking spots and two LCUs 290 located in a street, there is one connected vehicle 270 sending parking confirmation message to LCU 290 without precise GPS location information, after two LCUs cross check their received confirmation messages coming from the same connected vehicle 270, then the system can conclude that one parking spot is occupied and rest of them are available and report this information to CMS 210.

Transmission and Speed:

The speed of the vehicle must be 0 m/s when the driver intends to park.

Brake Status:

The brake status must be applied while the driver slows down the vehicle in order to park.

Vehicle Size:

The value can help the system to verify the size of the vehicle is less than the parking space.

Figure 7:
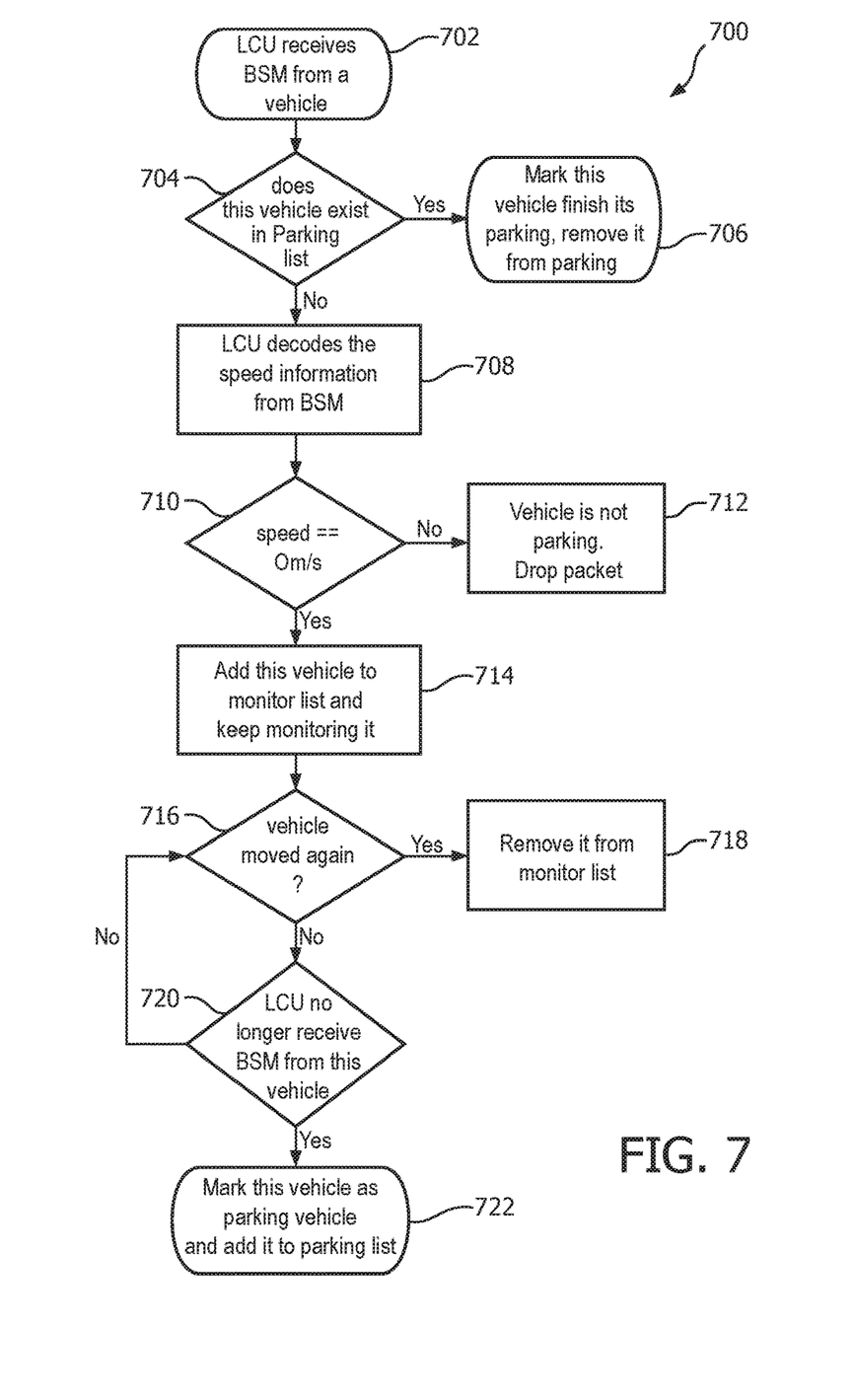
FIG. 7 illustrates an embodiment of a method to identify a vehicle entering/terminating the parking state.

FIG. 7 shows the process 700 that LCU 290 uses to identify a connected vehicle 270 entering the parking state and terminating the parking state. In step 702, the LCU 290 detects the start time and end time of a parking connected vehicle 270 by passively monitoring the received BSM message. In step 704, the LCU 290 determines whether connected vehicle 270 exists on a parking list (e.g. whether the connected vehicle is parking even if the driver did not confirm the action, for example by a user device or switch/button in the connected vehicle 270) stored in the PSDS/CMS or LCU 290. If so, in step 706, the connected vehicle is removed from the parking list. In step 708, the LCU 290 determines speed information of the connected vehicle 270. The LCU 290 detects the connected vehicle 270 is in this area by monitoring the broadcast BSM message from the connected vehicle 270. In step 710 it is determined if the connected vehicle's speed is 0. If not, in step 712, it is determined that the connected vehicle is not parking. If so, in step 714, the connected vehicle is added to parking list and monitored. In steps 716-720, it is determined if the connected vehicle 270 has moved again and whether to remove it from the parking list. For example, if the connected vehicle 270 continues reducing its speed until totally stops and shuts down its engine, then the broadcast message will stop transmission, LCU 290 will mark this connected vehicle 270 entering the parking state. If later, the LCU 290 starts to receive the broadcast message from the same connected vehicle 270, the LCU 290 may confirm that this connected vehicle 270 has parked, by enabling a parking confirmation, as described below. As shown in step 720, if the LCU 290 no longer receives the BSM from the connected vehicle 270, the system in step 722, marks the connected vehicle 270 as parked, and adds it to the parked list.

The LCU 290 could detect how many connected vehicles 270 are currently parking on its nearby parking spots and report the number of occupied (available) spots to CMS 210. It is not necessary to identify the parking spot accurately on each individual physical spot. It's good enough to identify how many spots are occupied from all of the parking spots nearby, because the total number of parking spots is already known and the number is steady over time.

Note that connected vehicle 270's identification is not required for tracking the parking space availability, but it is needed for providing the complete parking service including payment. The parking fee collection can still work well in all above scenarios, because only identification of the connected vehicle 270 and parking time length are useful for the fee collection, not the parking location.

In another embodiment a physical button (e.g. wireless communication device 225) in the connected vehicle 270 (dash board or on another mobile device) can be used to enable the user to control and confirm the intention to park the car at the current location and report the parking state. This button can also help the system record the parking start time and end time accurately. When the user presses the button, a parking confirmation message will be sent to LCU 290 with the following information.

Vehicle ID: The account number used by the backend system to charge the parking fee.

Parking state: This value could be Start and End, which indicates the current connected vehicle 270 starts and ends its parking state in particular.

Position: The last position value obtained from GPS, which can help the LCU 290 estimate the connected vehicle 270's parking location.

Time: The current timestamp obtained from GPS, which can be used to calculate the parking time length. This value is optional, since LCU 290 can fill up this field when it receives the message.

The CMS 210 can also disseminate the available parking space information to an outdoor display/signage 285 of FIG. 2, through wired or wireless communication, so that the display can show the nearby parking space availability information visually to the driver, such as red color on street A means there is no available parking spot, green color on street B shows there is plenty of parking space on that street. The CMS 210 can update the parking information on the Internet, such as using the same way to show traffic information in Google Maps. Meanwhile, CMS 210 can push the nearby parking space information upon user request to the smartphone or on-board control unit installed in the connected vehicle 270.

If there is no physical meter installed along the road, all of the payment can be made electronically using ETC system such as EZPass. As a result, there is no need for a person to visit every street physically to collect the parking fees.

According to another embodiment, the system provides integrated parking rate information, remote parking fee payment service, and issue charging confirmation. The system 200 uses existing content in the BSM, shown in FIG. 6, to retrieve connected vehicle's identification, with no need of adding new information to or from the ITS, meanwhile the system is still able to protect the vehicle and driver's privacy. The elements of BSM that are used include:

Temporary ID (TempID):

The randomly generated value on each vehicle and can be changed over time. The Temporary ID is used to distinguish the source of the BSM. In this design, this value can be used to carry the vehicle's ID or the account number, the details explained in the following section:

Latitude and Longitude:

These two values report the current location of the vehicle, which can be used to cross check with LCU's location to verify the approximate parking location, and make sure apply the correct parking rate.

Speed:

The current speed of the vehicle, can be used to help LCU detect the vehicle is in the moving state or parking state.

The connected vehicle 270 has an account number from the parking provider. The connected vehicle 270 uses a hash function to convert the account number into a 16 bits value. This hash function mentioned above will make sure there is no chance of two different account numbers to be converted into same value, in order to make sure each connected vehicle 270 will not be mistakenly charged. The original length of TempID in BSM is 16 bits, according to the standard this TempID is a random value and can be changed over time. The newly calculated hash value can replace the previous random value without affect the BSM message's format. To make sure the connected vehicle 270 cannot be tracked while it is moving in the city, the hash value of the account number replaces the TempID when the driver starts and stops the engine, during other periods, the TempID follows the ITS's standard, use a random number and can be changed over time. The engine start and stop time can be used to detect the vehicle's parking duration.

In order to protect the driver's privacy and enforce the connected vehicle 270 cannot be traceable, after the LCU 290 collects the parking payment using the hash value when the connected vehicle 270 completes its parking, LCU 290 forwards the hash value with the total amount parking fee to the CMS 210, without LCU's 290 identification information or any location related information. The total parking fee can be calculated on LCU 290 locally by multiplying the current parking rate and parking duration. In that case, CMS 210 only has the account information and billing information, without any knowledge of the location of the connected vehicle 270.

CMS 210 has the ability to map a hash value to the account number, so that the CMS 210 can apply the parking fees to each account. The transaction history is saved on the CMS 210 with the time and total amount, the LCU ID or location information is not saved, to make sure the connected vehicle's 270 parking location cannot be tracked in the transaction history.

CMS 210 disseminates the parking rates to the individual LCUs 290, based on their locations and different time, in order to enable the ability to adjust the parking fees dynamically and remotely. For instance, during the business hours, the parking fee in the downtown area is higher, while during the weekend this area is free for parking.

The LCU 290 detects how many connected vehicles 270 are currently parking on its nearby parking spots and reports the number of occupied (available) spots to CMS 210. It is not necessary to identify the parking spot accurately on each individual physical spot. It's adequate to identify how many spots are occupied from all of the parking spots nearby, because the total number of parking spots is already known and the number is steady over time.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An outdoor lighting network management system using an ITS (Intelligent Transportation System) infrastructure including ITS connected vehicles having wireless communication units and ITS connected devices, and a traffic management server in communication with the ITS connected vehicles and connected devices, the system comprising:
   an outdoor lighting network each including a plurality of light units, wherein each light unit includes a light control unit to communicate with other light units or the ITS connected vehicles and/or other connected devices;
   a lighting central management system in communication with said traffic management server, said lighting central management system, using the traffic management server, to send a lighting configuration/operation command to the outdoor lighting network or light unit and receive light unit information from the outdoor lighting network or light unit,
   wherein the traffic management server translates the lighting configuration/operation commands from a lighting protocol to an ITS protocol and map the light control units to an ITS connected vehicles and/or connected devices,
   wherein the light control unit receives one or more ITS message from the ITS connected vehicles, and uses the received ITS message to determine a speed of the ITS connected vehicles, and further determines whether the ITS connected vehicles has parked based on the speed of the ITS connected vehicle, continued reception of the ITS messages and a parking list stored in the lighting central management system or light control unit, and
   wherein the one or more ITS message is an ITS Basic Safety Message (BSM), and wherein the BSM includes latitude and longitude, transmission and speed, brake status and vehicle size, of the ITS connected vehicle.

2. The system of claim 1, wherein the traffic management server further receives a lighting asset information, wherein the lighting asset information describes the outdoor lighting network and maps the light units, using the lighting asset information, to a nearby ITS connected vehicles and/or connected devices in communication with the traffic management server.

3. The system of claim 1, wherein the lighting protocol is TALQ and the traffic management server further includes a TALQ bridge in communication with lighting central management system to receive the lighting asset information and model the outdoor lighting network.

4. The system of claim 3, wherein the lighting central management system includes lighting asset information of the light units and the traffic management server receives at least a portion of the lighting asset information from the lighting central management system to configure the TALQ bridge and ITS-light manager to transport the lighting configuration/operation commands using the ITS infrastructure.

5. The system of claim 4, wherein the lighting asset information includes at least one of asset data, location information, light unit capabilities.

6. The system of claim 1, wherein said lighting configuration/operation commands include at least one of a dimming configuration, a schedule configuration, a measurements configuration, and a color control configuration.

7. The system of claim 1, wherein traffic management server is in communication with each of the ITS connected vehicles and/or connected devices, and includes a traffic management server protocol stack having an application layer for non-safety applications messages and the lighting configuration/operation commands.

8. The outdoor lighting network management system of claim 1, wherein the ITS connected vehicle includes a user device to signal that ITS connected vehicle has parked.

9. The outdoor lighting network management system of claim 1, wherein account information of an ITS connected vehicle is stored in the lighting central management system or light control unit and a light control unit receives one or more ITS messages from the ITS connected vehicle, and uses the received ITS message to determine an identification of the ITS connected vehicle and based on the identification, continued reception of the ITS messages, and a hashed function of the account information of the ITS connected vehicle, the light control unite determines billing information for the parked ITS connected vehicle.

10. The outdoor lighting network management system of claim 9, wherein the one or more ITS message is an ITS Basic Safety Message (BSM), and wherein the BSM includes temporary ID, latitude and longitude, and speed, of the ITS connected vehicle.

11. An ITS-light manager, for use in an ITS traffic management server, the ITS-light manager comprising: a processor to receive a lighting asset information relating to an outdoor lighting network having a plurality of light units, and receive a lighting configuration/operation command from a lighting central management system of the outdoor lighting network, and translate the lighting configuration/operation command from a lighting protocol command to an ITS protocol command and map the light units, using the lighting asset information, to an ITS connected vehicles and/or connected devices in communication with the ITS traffic management server.

12. The ITS-light manager of claim 11, wherein the processor forms a lighting asset model, using the lighting asset information, that describes the outdoor lighting network that is used to send lighting configuration/operation command via the ITS connected vehicles and/or connected devices to a light unit.

13. The ITS-light manager of claim 11, wherein the lighting asset information includes at least one of asset data, location information, and light unit capabilities.

14. A method of managing an outdoor lighting network management system, using an ITS (Intelligent Transportation System) infrastructure including ITS connected vehicles having wireless communication units and ITS connected devices, and a traffic management server in communication with the ITS connected vehicles and connected devices, the outdoor lighting network including a lighting central management system and a plurality of light units, wherein each light unit communicates with other light units or the ITS connected vehicles and/or other connected devices, the method comprising:

in the traffic management server,
receiving lighting asset information from the lighting central management system, wherein the lighting asset information describes the outdoor lighting network, receiving a lighting configuration/operation command from the lighting central management system;

translating the lighting configuration/operation commands from a lighting protocol to an ITS protocol;

mapping the light units, using the lighting asset information, to an ITS connected vehicles and/or connected devices; and receiving one or more ITS messages from the ITS connected vehicles to determine a speed of the ITS connected vehicles;

determining whether the ITS connected vehicles has parked based on the speed of the ITS connected vehicle, continued reception of the ITS messages, and a parking list stored in the lighting central management system or light control unit, the light control unit, wherein the one or more ITS messages is an ITS Basic Safety Message (BSM), and wherein the BSM includes latitude and longitude, transmission and speed, brake status and vehicle size, of the ITS connected vehicle.

15. The method of claim 14 further including the steps of: modeling the outdoor lighting network, using the lighting asset information that is used to send a lighting configuration/operation command via the ITS connected vehicles and/or connected devices to a light unit.

16. The method of claim 14 further including the steps of:
sending, by the traffic management server, the translated lighting configuration/operation commands to the ITS connected vehicles and/or connected devices; and
sending, by the ITS connected vehicles and/or connected devices, the translated lighting configuration/operation commands, to a light unit.

17. The method of claim 14, wherein the lighting asset information includes at least one of asset data, location information, and light unit capabilities.

18. The method of claim 14, wherein said lighting configuration/operation commands include at least one of a dimming configuration, a schedule configuration, a measurements configuration, and a color control configuration.

* * * * *